(12) United States Patent
Jongren et al.

(10) Patent No.: US 8,842,559 B2
(45) Date of Patent: Sep. 23, 2014

(54) METHODS AND ARRANGEMENTS IN A MOBILE TELECOMMUNICATIONS SYSTEM

(75) Inventors: George Jongren, Stockholm (SE); Anders Furuskar, Stockholm (SE); Bo Goransson, Sollentuna (SE); Magnus Lundevall, Sollentuna (SE)

(73) Assignee: Unwired Planet, LLC, Reno, NV (US)

( * ) Notice: Subject to any disclaimer, the term of this patent is extended or adjusted under 35 U.S.C. 154(b) by 405 days.

(21) Appl. No.: 12/740,508

(22) PCT Filed: Jun. 30, 2008

(86) PCT No.: PCT/EP2008/058367
§ 371 (c)(1),
(2), (4) Date: Apr. 29, 2010

(87) PCT Pub. No.: WO2009/059816
PCT Pub. Date: May 14, 2009

(65) Prior Publication Data
US 2010/0309801 A1      Dec. 9, 2010

Related U.S. Application Data

(60) Provisional application No. 60/985,786, filed on Nov. 6, 2007.

(51) Int. Cl.
| | | |
|---|---|---|
| H04L 12/26 | (2006.01) | |
| H04L 25/02 | (2006.01) | |
| H04L 27/26 | (2006.01) | |
| H04L 5/00 | (2006.01) | |
| H04J 11/00 | (2006.01) | |
| H04L 1/20 | (2006.01) | |

(52) U.S. Cl.
CPC ............. *H04L 1/20* (2013.01); *H04L 25/0204* (2013.01); *H04L 27/2613* (2013.01); *H04L 5/0048* (2013.01); *H04J 11/0023* (2013.01); *H04L 5/0023* (2013.01); *H04L 25/0226* (2013.01)
USPC .......................................................... 370/252

(58) Field of Classification Search
USPC .......... 370/310–350, 431–465, 474, 476, 252
See application file for complete search history.

(56) References Cited

U.S. PATENT DOCUMENTS

| | | | | |
|---|---|---|---|---|
| 7,058,028 | B1* | 6/2006 | Holma et al. | 370/318 |
| 7,756,007 | B2* | 7/2010 | Nicoli et al. | 370/210 |
| 2003/0053523 | A1* | 3/2003 | Xu | 375/147 |
| 2005/0190868 | A1* | 9/2005 | Khandekar et al. | 375/346 |
| 2006/0013338 | A1* | 1/2006 | Gore et al. | 375/324 |
| 2007/0060178 | A1* | 3/2007 | Gorokhov et al. | 455/506 |
| 2007/0223611 | A1* | 9/2007 | Ode et al. | 375/260 |
| 2008/0235311 | A1* | 9/2008 | Budianu et al. | 708/290 |

FOREIGN PATENT DOCUMENTS

| | | |
|---|---|---|
| EP | 1 324 510 A1 | 7/2003 |
| EP | 1 337 054 A2 | 8/2003 |
| EP | 1 480 350 A1 | 11/2004 |
| WO | WO 2006/011078 A1 | 2/2006 |
| WO | WO 2007093379 A1 * | 8/2007 |

OTHER PUBLICATIONS

International Search Report dated Dec. 2, 2008 (3 pages).
International Preliminary Report on Patentability dated Dec. 29, 2009 (6 pages).
3GPP TSG-RAN WG1 #51, R1-074855, Ericsson, "CQI Measurement Methodology", Jeju, Korea, Nov. 5, 2009, 2007.

* cited by examiner

*Primary Examiner* — Kwang B Yao
*Assistant Examiner* — Juvena Loo
(74) *Attorney, Agent, or Firm* — Nixon & Vanderhye, P.C.

(57) ABSTRACT

The present invention relates to a solution for taking into account that the interference, which each of the transmission resource elements is affected by, may differ between the different transmission resource elements when determining an interference estimate by determining a mixed interference estimate, e.g. based on both reference symbols and data symbols. Furthermore, signalling from the network is also introduced which makes it possible to control what the mixed interference estimate should be based on.

34 Claims, 5 Drawing Sheets

METHODS AND ARRANGEMENTS IN A MOBILE TELECOMMUNICATIONS SYSTEM

TECHNICAL FIELD

The present invention relates to methods and arrangements in a mobile telecommunications system, in particular to methods and arrangements for interference estimation in the telecommunications system.

BACKGROUND

The Universal Mobile Telecommunication System (UMTS) Terrestrial Radio Access Network (UTRAN) is the radio network of a UMTS system, which is one of the third-generation (3G) mobile communication networks. Evolved UMTS Terrestrial Radio Access Network (E-UTRAN), also referred to as Long Term Evolution (LTE) is standardized by 3GPP. Long Term Evolution (LTE) which is a project within the 3rd Generation Partnership Project (3GPP) to improve the UMTS standard with High Speed Packet Access functionality to cope with future requirements in terms of improved services such as higher data rates, improved efficiency, lowered costs etc.

An E-UTRAN typically comprises user equipments (UE) 120 wirelessly connected to radio base stations 130A-D as illustrated in FIG. 1. In the E-UTRAN, the radio base stations 130A-D are directly connected to a core network (CN) 100 e.g. via a mobility management entity (MME). In addition, the radio base stations 130A-D are also connected to each other via an interface. The base stations are usually referred to as NodeB in UTRAN and to eNodeB in E-UTRAN. In the E-UTRAN, each radio base station 130A-D uses an Orthogonal Frequency-Division Multiplexing (OFDM) time-frequency grid 140 for data transmission to user equipments within each cell. The OFDM time-frequency grids transmitted from different base station interfere with each other, which reduce channel quality in the E-UTRAN. A part of the OFDM time-frequency grid 140 transmitted from a base station is illustrated in FIG. 1. The grid 140 consists of transmission resource elements of different types. There are for instance transmission resource elements used for data transmission 160, for reference symbols (RS) 150, 180. Hence, the reference symbols may be placed among both the transmission resource elements used for data transmission 160 and among the transmission resource elements 170 used for control signalling. The interference situation for these types of transmission resource may be different. This depends on that the transmission resource elements may be differently power controlled and that the amount of dispersion in a propagation channel and different parts of a frequency band may undergo different fading realizations.

The radio base station needs to have some measure of how "good" the channel is to e.g. determine proper data rate, modulation scheme, and transmit power. Accordingly, the mobile terminal provides a measure of channel quality to the radio base station by means of Channel Quality Indicator (CQI) values that are continuously fed back to the radio base station on an uplink channel. The mobile terminal determines the CQI values based on measurements made on e.g. the common reference symbols (RS) 150 transmitted in the OFDM time-frequency grids from the base station. The noise and interference between the cells are important quantities when estimating e.g. the CQI. The knowledge of the amount of noise and interference is also important to be able to demodulate the information correctly. The common reference symbols (RS) in the OFDM time frequency grid transmitted from each base station may be used to estimate the interference. A received signal "r" may be expressed as r=Hs+n, where "H" is a channel response, "s" represents transmitted symbols and "n" represents unknown noise and interference. It is noted that the noise and the interference on an RS, referred to as I_RS, may be estimated since "s" comprises known symbols and "H" is given by a channel estimator. It is further noted that the interference on data symbols, I_d, also may be measured as soon as the data symbols (s) are detected and that they at this moment may be regarded as known symbols.

A problem is that there is a limited set of reference symbols, and in particular for Multiple Input Multiple Output (MIMO) where a position holding a reference symbol on one antenna is unused for a neighbouring antenna, the statistics of the estimated interference may therefore be very poor. The RS grid, i.e. how the reference symbols are allocated, in case of one transmit (Tx) antenna is illustrated in FIG. 1. Between the cells, the reference symbols are shifted in the frequency domain. For e.g. two Tx antennas only three frequency shifts for common reference symbols exists which results in that not all data interference can be measured. It is also difficult to plan these shifts, since it may be difficult to allocate different shifts to different cells since there are too few of them. There are only three orthogonal patterns for 2×2 MIMO, but there might be more than two interfering cells. Furthermore, the first three OFDM symbols 170 might be affected by control channel interference instead of data interference. The control signalling can occupy up to 3 OFDM symbols (first 3). If the network is time synchronized, the control channels from all cells will overlap. This means that the RS located in the first symbol will be hit by control signalling, while RS located in the $5^{th}$ OFDM symbol will be hit by data. Since control and data may be transmitted with different power, the interference might be different.

As mentioned above, the control signalling may be differently power controlled than the data, the interference estimate obtained on these common reference symbols may therefore not reflect the interference situation for the data transmission. Also if common reference symbols in a subsequent part of a sub-frame is removed, in which case a dedicated reference symbol will be inserted instead, it might be necessary to measure interference on data symbols instead. Since this in general is a very complex operation, simplifications of the procedure are necessary. It is further noted that when using the interference estimate for calculating e.g. the CQI, it is important to have a well defined measure for the interference estimate. This depends on that a network scheduler is using a reported CQI for resource allocation and it is therefore important that the scheduler knows that all terminals have a common notion of the CQI.

SUMMARY

The object of the present invention is thus to achieve methods and arrangements for improved interference estimation.

According to a first aspect of the present invention a method in a UE is provided. The UE is connectable to a network node of mobile telecommunication network for determining an interference estimate. In the method at least a first set of mixing parameters defining a set of interference estimates from at least a first type of resource elements is received. Interference estimates are then determined on the at least a first type of resource elements and a mixed interference estimate is determined based on interference estimates on the at least a first type of resource elements applying said received at least first set of mixing parameters to the determined interference estimates.

According to a second aspect a method in a network node of mobile telecommunication network is provided. The network node is wirelessly connectable to a user equipment for determining an interference estimate. In the method, at least a first set of mixing parameters defining a mix of interference estimates from at least a first type of resource elements to be used for determining a mixed interference estimate at the user equipment is defined. Said at least the first set of mixing parameters defining a mix of interference estimates from at least a first type of resource elements is transmitted to the user equipment.

According to a third aspect a UE is provided. The UE is connectable to a network node of mobile telecommunication network for determining an interference estimate. The UE comprises a receiver configured to receive at least a first set of mixing parameters defining a set of interference estimates from at least a first type of resource elements. The UE comprises further an estimator configured to determine interference estimates on the at least a first type of resource elements and to determine a mixed interference estimate based on interference estimates on the at least a first type of resource elements applying said received at least first set of mixing parameters to the determined interference estimates.

According to a fourth aspect a network node of mobile telecommunication network is provided. The network node is wirelessly connectable to a user equipment for determining an interference estimate. The network node comprises a processor configured to define at least a first set of mixing parameters defining a mix of interference estimates from at least a first type of resource elements to be used for determining a mixed interference estimate at the user equipment and a transmitter configured to transmit said at least a first set of mixing parameters defining a mix of interference estimates from at least a first type of resource elements to the user equipment.

The received at least a first set of mixing parameters may define a mix of interference estimates from at least two different types of resource elements. In this case, the determined interference estimates are estimated on a first type and on at least a second type of resource elements. The determined mixed interference is then estimated based on interference estimates on a first type of resource elements and interference estimates on at least a second type of resource elements applying said received at least first set of mixing parameters to said interference estimates.

Accordingly, the present invention provides a solution taking into account that the interference, which each of the transmission resource elements is affected by, may differ between the different transmission resource elements when determining an interference estimate. Furthermore, signalling from the network is also introduced which makes it possible to control what the mixed interference estimate should be based on.

Advantages with embodiments of the present invention are improved capacity, coverage and quality, enabled through more accurate link adaptation, power control and scheduling. The more accurate link adaptation, power control and scheduling are enabled by the improved interference estimation.

BRIEF DESCRIPTION OF THE DRAWINGS

The invention will in the following be described in more detail with reference to enclosed drawings, wherein.

DETAILED DESCRIPTION

Figure 1:
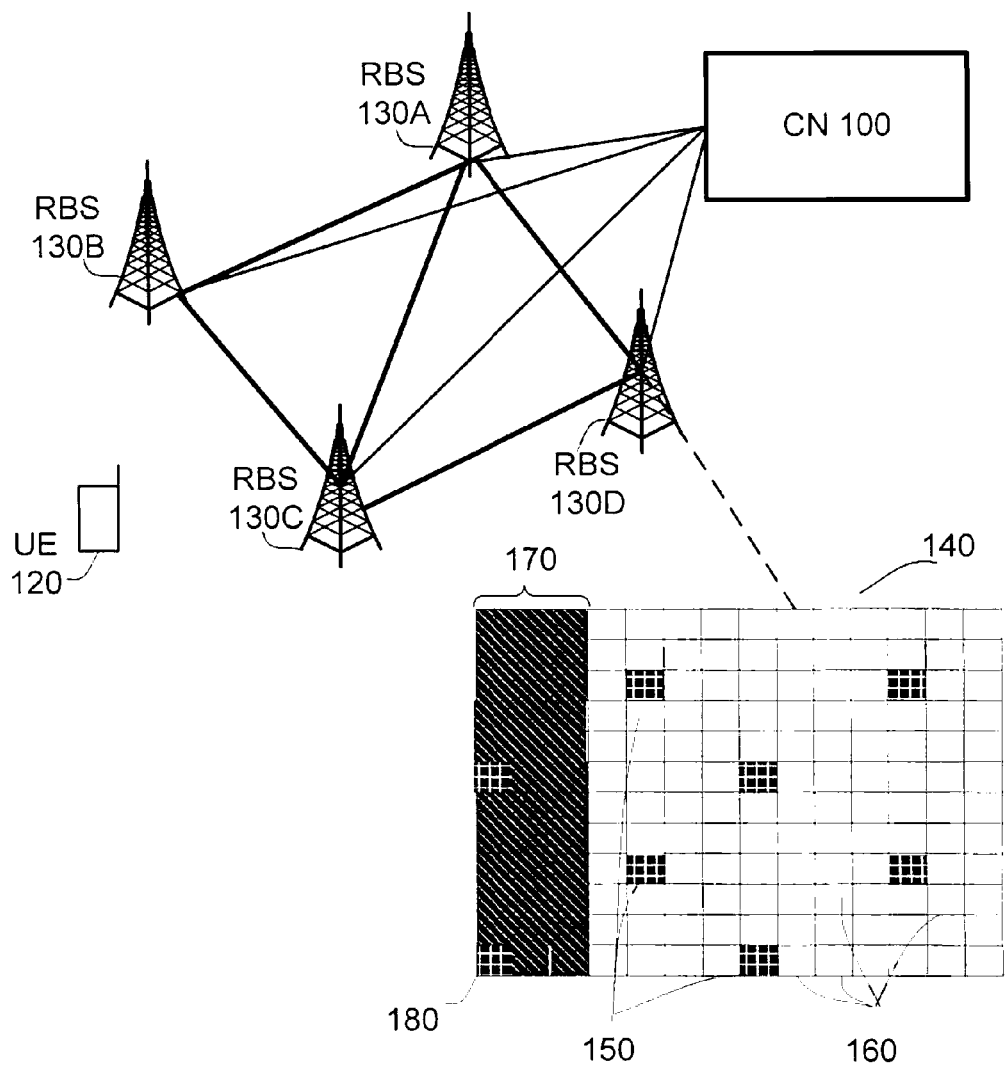
FIG. 1 illustrates schematically a wireless communication network wherein the present invention may be implemented and transmission resource elements used for one antenna port exemplifying how the reference symbols are allocated.

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention relates to methods and arrangements for controlling a UE to perform a mixed interference estimate. Hence, signaling of mixing parameters from a network node, e.g. the base station, to the UE is introduced which makes it possible to control what the mixed interference estimate should be based on. The mixed interference estimate is based on interference estimates performed on at least a first type of transmission resource elements and the mixing parameters defines a set of interference estimates from at least a first type of resource elements. The different types comprise transmission resource elements used for transmission of data and reference symbols. The reference symbols may be placed among both the transmission resource elements used for data transmission and the transmission resource elements used for control channel signalling. E.g., in LTE, the control channel can span up to three symbols.

Thus, the mixing parameters may define a set of interference estimates from reference symbols and data symbols and also a set comprising only reference symbols, reference symbols used for control signalling or data symbols. The reference symbols may be both common and dedicated reference symbols. If the mixing parameters define e.g. a set comprising only reference symbols, the mixing may indicate that only a subset of the reference symbols should be used for interference estimation. Accordingly, the present invention provides a solution making it possible to take into account that the interference, which each of the transmission resource elements is affected by, may differ between the different transmission resource elements when determining an interference estimate.

According to embodiments of the present invention, interference estimates on two or three different resource types are used for determining the mixed interference estimate. The different types of resource elements are defined by the mixing parameters. The mixing parameters may further comprise weights or a set of symbols on which to estimate the interference. This implies that different combinations of interference estimates on reference symbols and data symbols can be used for determining the mixed interference estimate. In addition, only a subset of e.g. the reference symbols and the reference symbols may be used for the mixed interference estimate or weights may be applied to the reference symbols and the data symbols.

Figure 2:
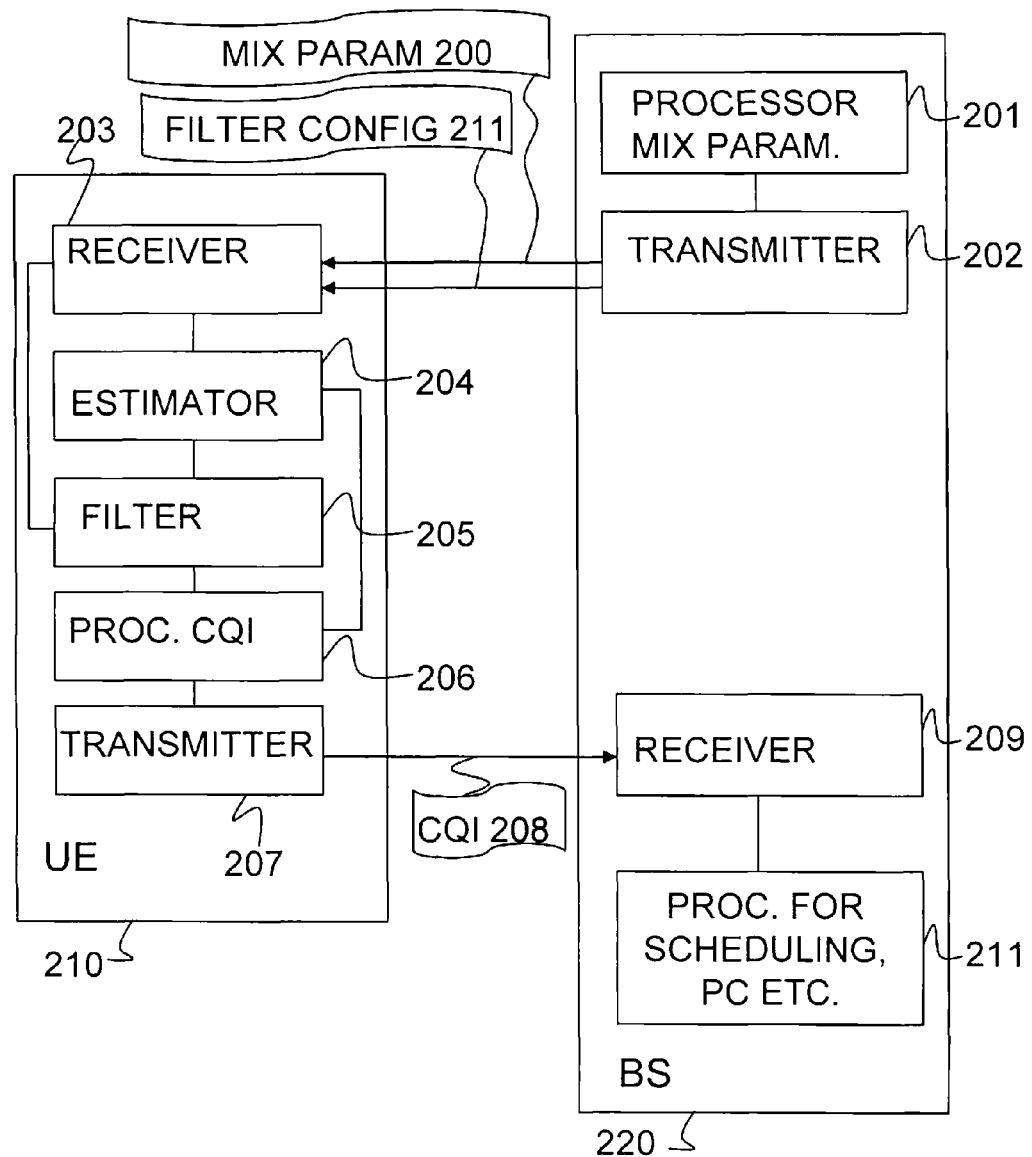
FIG. 2 illustrates a user equipment and a base station according to embodiment of the present invention.

Turning now to FIG. 2, showing an embodiment of the present invention. FIG. 2 shows a UE 210 connected to a network node, exemplified by a radio base station (BS) 220. The BS 220 comprises a processing unit 201 configured to define the mixing parameters 200, e.g. defining that data symbols and reference symbols should be used for determining the mixed interference estimate. The BS 220 further comprises a transmitter 202 for sending the mixing parameters 200 to the UE 210. Hence the UE 210 comprises a receiver 203 for receiving the mixing parameters 200 and an interference estimator 204 configured to estimate the interference on the resource type(s) defined by the mixing parameters 200, i.e. on the data symbols and the reference symbols in this case. The interference estimator 204 is further configured to determine the mixed interference based on said interference estimates by applying the received mixing parameters.

The mixed interference may be used to determine the channel quality indicator (CQI) 208. The interference can vary rapidly in time and frequency, filtering of the estimated property may therefore be needed. Hence, in order to pretend that there is spatially and temporally white noise, the mixed interference estimate may be filtered by filtering means 205 before determining the CQI. As an alternative, at least one of the interference estimates on the type(s) of resource elements may be filtered before the mixed interference estimate is determined. E.g., if the mixing parameters indicate that the mixed interference estimate should be based on the interference estimates on the reference symbols and on the data symbols, the estimated interference on the reference symbols and/or the estimated interference on the data symbols may be filtered before the mixed interference is determined.

The filtering means 205 may be controlled by the network, which implies that the transmitter 202 of the BS 220 is further configured to signal filter configurations 211 to the UE 210. The filter configurations 211 may be defined by the processing means 201 and comprise filter parameters such as a forgetting factor or the time/frequency grid of the filtering means 205.

Therefore, the receiver 203 of the UE 210 is further configured to receive said filter configurations 211 and apply those to the filtering means 205. The UE 210 comprises according to this illustrated embodiment filtering means 205, a processor 206 for determining the CQI 208 based on the filtered mixed interference estimate, and a transmitter 207 for sending the CQI 208 to the BS 220. The BS 220 comprises a receiver for receiving the CQI 208 and the CQI 208 may be used by processing means 211 in the BS 220 for scheduling and power control. It should however be noted that the embodiment of the present invention may also be used without the filtering means 205.

By means of the mixing parameters sent from the network node to the UE, the network can control how the UE should determine the mixed interference estimate. The mixing parameters 200 may be defined individually for the different UEs, or in the same way for a group of UEs. If the mixing parameters 200 are defined in the same way for a group of UEs, the mixing parameters 200 may be broadcasted to the UEs.

The mixing parameter can e.g. be part of the standard or it can be decided by the network (eNodeB). Exactly how to choose the mixing parameter depends on the system. If a lot of interference is expected from e.g. control signalling, this might be reflected in mixing parameters so that the interference term corresponding to the control part e.g. gets a larger weight. Similar reasoning may be applied to the other terms. How to set the mixing parameters can also depend on the load in the system and how bursty the interference is. Preferably there are a few pre-defined mixes that can be signalled to the UEs. Some different examples are mentioned below.

According to one embodiment the mixing parameters 200 comprise a vector of weights for the different types of resource elements, e.g., $\{M\_RS, M\_d\}$, where M_RS is a weight to be applied to the interference estimates of the reference symbols and M_d is a weight to be applied to the interference estimates of the data symbols. In this case, the UE 210 may determine a mixed interference estimate according to the formula $$I\_mix = (M\_RS \times I\_RS) + (M\_d \times I\_d),$$

where I_mix is the mixed interference, I_RS is the interference estimated on the reference symbols and M_d is the interference estimated on the data symbols.

The mixing parameters 200 may also describe sets of symbols to estimate the interference on of which e.g. some are reference symbols, and some are data symbols according to further embodiments. The sets of symbols may comprise symbols distributed over the transmission resource elements in order to achieve a good interference estimate.

According to embodiments of the present invention, the network node 220 defines a plurality of sets of mixing parameters 200 for one UE 210, wherein the mixing parameters 200 differ between the different sets. The usage of the sets of mixing parameters 200 may be time dependent. A first and one additional set of mixing parameters 200 may be applied intermittently when repeatedly determining the mixed interference estimate.

The selection of the types of transmission resource elements and the subsets alternatively the weighting factors may be based on several factors which in turn depends on a desired usage of the mixed interference estimate. The interference on the reference symbols is typically more stable, but does not reflect load on the transmission resource elements used for data transmission. The interference on the transmission resource elements used for data transmission fluctuates and is difficult to track, but reflects traffic load and spatial-temporal variations. The load on the control channel is reflected by the interference on the transmission resource elements used for control signalling.

Figure 3:
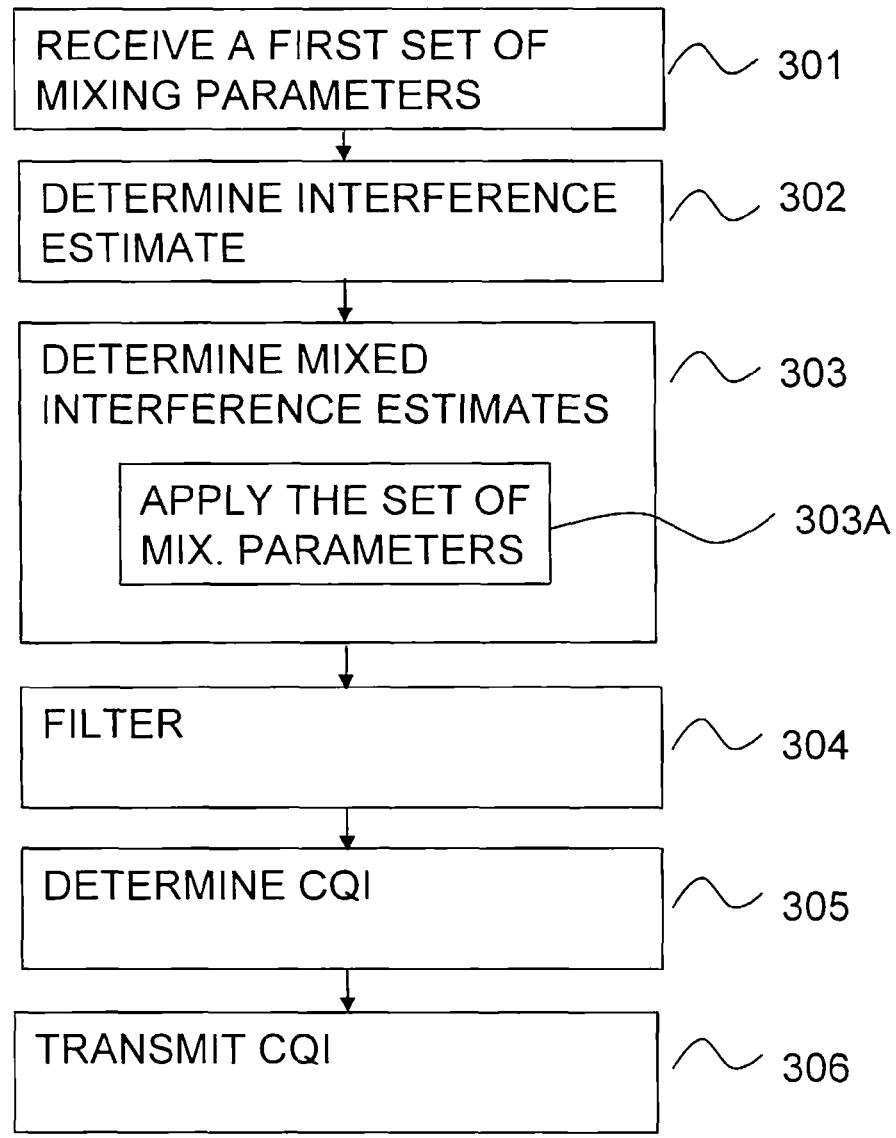
FIGS. 3-5 are flowcharts of the methods according to embodiments of the present invention.

Turning now to FIG. 3 which is a flowchart of the method in a UE according to an embodiment of the present invention.

In step 301 at least a first set of mixing parameters defining a set of interference estimates from at least a first type of resource elements is received. Interference estimates on the at least a first type of resource elements are determined in step 302 and a mixed interference estimate is determined in step 303. The mixed interference estimate is based on interference estimates on the at least a first type of resource elements applying (step 303A) said received at least first set of mixing parameters to the determined interference estimates.

As stated above, the received at least a first set of mixing parameters may define a mix of interference estimates from at least two different types of resource elements, wherein the determined interference estimates are estimated on a first type and on at least a second type of resource elements. Accordingly, the determined mixed interference is estimated based on interference estimates on a first type of resource elements and interference estimates on at least a second type of resource elements applying said received at least first set of mixing parameters to said interference estimates.

It should be noted that said at least first set of mixing parameters may define a mix of interference estimates from at least three different types of resource elements. In this case, the determination of the mixed interference estimate is also based on interference estimates on a third type of resource elements.

Said different types of resource elements are selected from a group of resource elements comprising: reference symbols, data symbols or reference symbols on a control channel or combinations thereof. As stated above, the set of mixing parameters may, in addition to the type(s) of resource elements, comprise weights or/and a set of symbols on which to estimate interference.

With further reference to FIG. 3, in step 304, the determined mixed interference estimate is filtered. It should be noted, as discussed above in conjunction with FIG. 2, that the determined interference estimates on the at least a first type of resource elements may also be filtered before the mixed interference is determined.

The channel quality indicator (CQI) calculated by using the mixed interference estimate is determined in step 305 and the CQI is transmitted to the network node in step 306.

Figure 4:
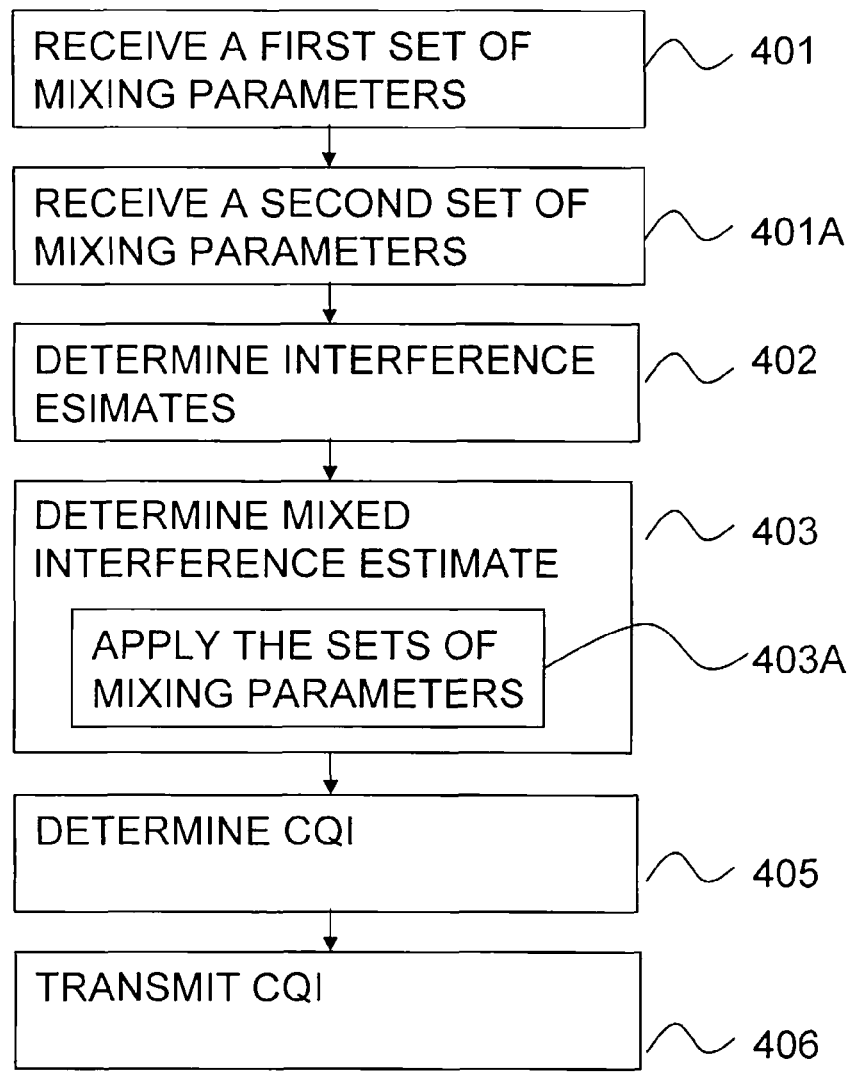

FIG. 4 is a flowchart of the method according to a further embodiment. In this embodiment, one additional set of mixing parameters is received from the network node and used for determining the mixed interference estimate. The step 401-step 406, respectively, corresponds to step 301-step 306, respectively, of FIG. 3. Further explanation of these steps is therefore omitted. In step 401A at least one additional set of mixing parameters is received in step 401A, and said first and said additional set of mixing parameters are applied intermittently in step 403A when repeatedly determining said mixed interference estimate in step 403.

The first set of mixing parameters may differ from the additional set of mixing parameters. I.e., the first set of mixing parameters may define that data symbols and reference symbols should be used for the mixed interference while the additional set of mixing parameters may define that only reference symbols used for control signalling should be used for determining the mixed interference estimate. Furthermore, the first set of mixing parameters may further comprise a first set of symbols on which to estimate interference and the additional set of mixing parameters may further comprise a second set of symbols on which to estimate interference. Alternatively, the first set of mixing parameters may comprise a first set of weights and the additional set of mixing parameters may comprise a second set of weights.

Figure 5:
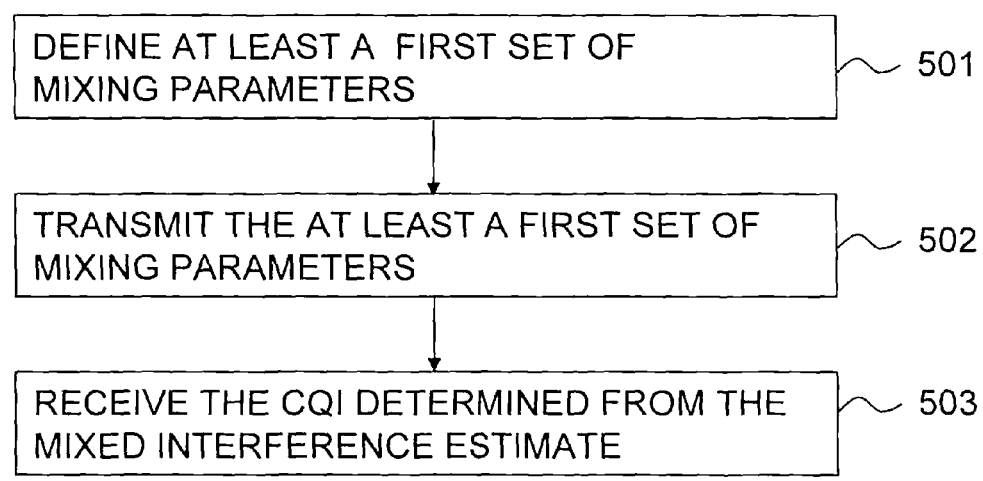

Turning now to FIG. 5, showing a method in a network node of mobile telecommunication network wirelessly connectable to a user equipment. In step 501, at least a first set of mixing parameters is defined wherein the mixing parameters define a mix of interference estimates from at least a first type of resource elements to be used for determining a mixed interference estimate at the user equipment. Said at least a first set of mixing parameters are transmitted to the user equipment in step 502. In step 503 the CQI is received, wherein the CQI is determined based on the mixed interference estimate.

If the at least a first set of mixing parameters is defined for a group of UEs, said set of mixing parameters may be transmitted on a broadcast channel. In contrast, if the at least a first set of mixing parameters is defined individually for the UEs, said set of mixing parameters is transmitted on a dedicated channel.

By being able to determine the mixed interference estimate from different types of transmission resource elements according to embodiments of the present invention, a more accurate interference estimation can be done, which leads to improved capacity, coverage and quality through more accurate link adaption, power control and scheduling.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method in a user equipment connected to a network node of mobile telecommunication network for determining an interference estimate, the method comprising:
   receiving at least a first set of mixing parameters from the network node, the mixing parameters defining a set of interference estimates for at least a first type of resource elements of an Orthogonal Frequency-Division Multiplex (OFDM) time-frequency grid,
   determining interference estimates on the at least a first type of resource elements, and
   determining a mixed interference estimate based on applying said received at least first set of mixing parameters to the determined interference estimates;
   wherein the first type of resource elements comprises reference symbols; and
   wherein at least one of the reference symbols is assigned to a control channel signaling portion of the OFDM time-frequency grid.

2. The method according to claim 1, where the received at least a first set of mixing parameters defines a mix of interference estimates for at least two different types of resource elements, the determined interference estimates are estimated on the first type and on at least a second type of resource elements and the determined mixed interference is estimated based on interference estimates on a first type of resource elements and interference estimates on the at least the second type of resource elements applying said received at least first set of mixing parameters to said interference estimates.

3. The method according to claim 1, further comprising: receiving at least one additional set of mixing parameters, and applying said first and said additional set of mixing parameters intermittently when repeatedly determining said mixed interference estimate.

4. The method according to claim 3, where the first set of mixing parameters and the at least one additional set of mixing parameters define different sets of interference estimates.

5. The method according to claim 2, where said at least first set of mixing parameters defines a mix of interference estimates for at least three different types of resource elements, and the determination of the mixed interference estimate is also based on interference estimates on a third type of resource elements.

6. The method according to claim 1, where said first set of mixing parameters comprises weights.

7. The method according to claim 1, where said first set of mixing parameters comprises a set of symbols on which to estimate interference, where at least one set of symbols comprises different types of resource elements.

8. The method according to claim 7, where said different types of resource elements are selected from a group of resource elements comprising: the reference symbols, data symbols, or combinations thereof.

9. The method according to claim 1, further comprising: determining a channel quality indicator (CQI) based on the determined mixed interference estimate, and transmitting the CQI to the network node of the mobile telecommunication network.

10. The method according to claim 1, further comprising: filtering the determined mixed interference estimate or filtering the determined interference estimates on the at least a first type of resource elements.

11. A method in a network node of a mobile telecommunication network wirelessly connected to a user equipment for determining an interference estimate, the method comprising:
   defining at least a first set of mixing parameters defining a mix of interference estimates for at least a first type of resource elements of an Orthogonal Frequency-Division Multiplex (OFDM) time-frequency grid, to be used for determining a mixed interference estimate at the user equipment, and
   transmitting said at least the first set of mixing parameters defining a mix of interference estimates from at least a first type of resource elements to the user equipment;
   wherein the first type of resource elements comprises reference symbols; and
   wherein at least one of the reference symbols is assigned to a control channel signaling portion of the OFDM time-frequency grid.

12. The method according to claim 11, where the at least a first set of mixing parameters defines a mix of interference estimates for at least two different types of resource elements.

13. The method according to claim 11, where said first set of mixing parameters comprises weights.

14. The method according to claim 11, where said first set of mixing parameters comprises a set of symbols on which to estimate interference, where at least one set of symbols comprises different types of resource elements.

15. The method according to claim 12, where said different types of resource elements are selected from a group of resource elements comprising: the reference symbols, data symbols, or combinations thereof.

16. The method according to claim 11, where the transmitted said at least a first set of mixing parameters is transmitted on a broadcast channel.

17. The method according to claim 11, where the transmitted said at least a first set of mixing parameters is transmitted on a dedicated channel.

18. A user equipment (UE) connectable to a network node of a mobile telecommunication network for determining an interference estimate, the UE comprising:
   a receiver to receive at least a first set of mixing parameters from the network node, the mixing parameters defining a set of interference estimates for at least a first type of resource elements of an Orthogonal Frequency-Division Multiplex (OFDM) time-frequency grid, and
   an estimator to determine interference estimates on the at least the first type of resource elements, and determine a mixed interference estimate based on applying said received at least first set of mixing parameters to the determined interference estimates;
   wherein the first type of resource elements comprises reference symbols; and
   wherein at least one of the reference symbols is assigned to a control channel signaling portion of the OFDM time-frequency grid.

19. The UE according to claim 18, where the received at least a first set of mixing parameters defines a mix of interference estimates for at least two different types of resource elements, the determined interference estimates are estimated on a first type and on at least a second type of resource elements and the determined mixed interference is estimated based on interference estimates on a first type of resource elements and interference estimates on at least a second type of resource elements applying said received at least first set of mixing parameters to said interference estimates.

20. The UE according to claim 18, where the receiver is further to receive at least one additional set of mixing parameters, and the estimator is further to apply said first and said additional set of mixing parameters intermittently when repeatedly determining said mixed interference estimate.

21. The UE according to claim 20, where the first set of mixing parameters and the at least one additional set of mixing parameters define different sets of interference estimates.

22. The UE according to claim 19, where said at least first set of mixing parameters defines a mix of interference estimates from at least three different types of resource elements, and the estimator is further to determine the mixed interference estimate also based on interference estimates on a third type of resource elements.

23. The UE according to claim 18, where said first set of mixing parameters comprises weights.

24. The UE according to claim 18, where said first set of mixing parameters comprises a set of symbols on which to estimate interference, where at least one set of symbols comprises different types of resource elements.

25. The UE according to claim 24, where said different types of resource elements are selected from a group of resource elements comprising: the reference symbols, data symbols, or combinations thereof.

26. The UE according to claim 18, where the UE further comprises: a processor to determine a channel quality indicator (CQI) based on the determined mixed interference estimate, and a transmitter to transmit the CQI to the network node of the mobile telecommunication network.

27. The UE according to claim 18, further comprising: filtering means for filtering the determined mixed interference estimate or the determined interference estimates on the at least a first type of resource elements.

28. A network node of a mobile telecommunication network wirelessly connectable to a user equipment for determining an interference estimate, the network node comprising:
   a processor to define at least a first set of mixing parameters defining a mix of interference estimates for at least a first type of resource elements of an Orthogonal Frequency-Division Multiplex (OFDM) time-frequency grid, to be used for determining a mixed interference estimate at the user equipment, and
   a transmitter to transmit said at least a first set of mixing parameters defining a mix of interference estimates from the at least the first type of resource elements to the user equipment;
   wherein the first type of resource elements comprises reference symbols; and
   wherein at least one of the reference symbols is assigned to a control channel signaling portion of the OFDM time-frequency grid.

29. The network node according to claim 28, where the processor is to define the at least a first set of mixing parameters to define a mix of interference estimates for at least two different types of resource elements.

30. The network node according to claim 28, where the processor is to define the at least a first set of mixing parameters to comprise weights.

31. The network node according to claim 28, where the processor is to define the at least a first set of mixing parameters to comprise a set of symbols on which to estimate interference, where at least one set of symbols comprises different types of resource elements.

32. The network node according to claim 31, where said different types of resource elements are selected from a group of resource elements comprising: the reference symbols, data symbols, or combinations thereof.

33. The network node according to claim 28, where the transmitter is to transmit said at least a first set of mixing parameters on a broadcast channel.

34. The network node according to claim 28, where the transmitter is to transmit said at least a first set of mixing parameters on a dedicated channel.

* * * * *